United States Patent Office 3,796,708
Patented Mar. 12, 1974

3,796,708
SUBSTITUTED 1-PHENYL-4-N-ACETOACETATA-
MINO-5-HALOPYRIDAZONE-(6) COMPOUNDS
Wolfgang Vilsmeier, Bad Durkheim, and Adolf Fischer, Mutterstadt, Germany, assignors to Badische Anilin- & Soda-Fabrik Aktiengesellschaft, Ludwigshafen (Rhine), Germany
No Drawing. Filed Feb. 22, 1971, Ser. No. 117,747
Claims priority, application Germany, Mar. 5, 1970,
P 20 10 397.3
Int. Cl. C07d 51/04
U.S. Cl. 260—250 A             3 Claims

ABSTRACT OF THE DISCLOSURE

New and valuable 1-phenyl-4-acetoacetatamino-5-halopyridazone-(6) compounds which have a good herbicidal action and a process for controlling the growth of unwanted plants with these compounds.

---

The present invention relates to new and valuable 1-phenyl-4-N-acetoacetatamino-5-halopyridazone-(6) compounds having a good herbicidal action and their use as herbicides.

It is known to use 1-phenyl-4-amino-5-bromopyridazone-(6) as a herbicide. However, its action is unsatisfactory.

We have now found that substituted 1-phenyl-4-N-acetoacetatamino-5-halopyridazone-(6) compounds of the formula

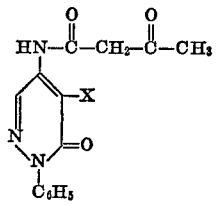

where X denotes bromine or chlorine, have a good herbicidal action. This action is particularly in evidence on the unwanted plants Bromus tectorum and Echinochloa crus-galli while the crop plants Hordeum vulgare, Triticum spp., Soja hispida and Zea mays are not damaged. The application rates are from 1 to 4 kg. per hectare. The active ingredients may be used either pre- or post-emergence.

The active ingredients may be prepared by reacting the appropriate phenylaminopyridazone compounds with diketene.

EXAMPLE 1

250 parts (by weight) of toluene, 53.2 parts of 1-phenyl-4-amino-5-bromopyridazone-(6), 0.5 part of p-toluenesulfonic acid and 0.1 part of hydroquinone are boiled under reflux. 17 parts of diketene is then slowly added and the mixture heated for a further hour under reflux. After the mixture has cooled, the precipitate is suction filtered and washed with toluene, ligroine and ethyl alcohol. There is obtained 55 parts of crude 1-phenyl-4-acetoacetatamino-5-bromopyridazone-(6) having a melting point of 128° to 130° C. After recrystallization from alcohol the pure product, melting at 140° to 141° C., is obtained.

The corresponding chloro derivative is obtained in the same way: instead of 53.2 parts of 1-phenyl-4-amino-5-bromopyridazone-(6) there is used 44.3 parts of 1-phenyl-4-amino-5-chloropyridazone-(6). The 1-phenyl-4-acetoacetatamino-5-chloropyridazone-(6) obtainable in this manner melts at 127° to 129° C.

The agents according to the invention may be used as solutions, emulsions, suspensions or dusts. The form of application depends entirely on the purpose for which the agents are being used; in any case it should ensure a fine distribution of the active ingredient.

For the preparation of solutions to be sprayed direct, hydrocarbons having boiling points higher than 150° C., e.g. tetrahydronaphthalene or alkylated naphthalenes, or organic liquids having boiling points higher than 150° C. and having one or more than one functional group, e.g. the keto group, the ether group, the ester group or the amide group, this group or these groups being attached as substituent(s) to a hydrocarbon chain or being a component of a heterocyclic ring, may be used as spray liquids.

Aqueous formulations may be prepared from emulsion concentrates, pastes or wettable powders by adding water. To prepare emulsions the ingredients as such or dissolved in a solvent may be homogenized in water or organic solvents by means of wetting or dispersing agents, e.g. polyethylene oxide adducts. Concentrates which are suitable for dilution with water may be prepared from active ingredient, emulsifying or dispersing agent and possibly solvent.

Dusts may be prepared by mixing or grinding the active ingredients with a solid carrier, e.g. kieselguhr, talc, clay or fertilizers.

The following examples demonstrate the application and use of the new active ingredients.

EXAMPLE 2

The plants Beta vulgaris, Zea mays, Soja hispida, Triticum spp., Hordeum vulgare, Echinochloa crus-galli, Bromus tectorum, Chrysanthemum spp., Galinsoga parviflora and Atriplex spp. were treated at a growth height of 4 to 15 cm. with 2 kg. per hectare of 1-phenyl-4-N-acetoacetatamino-5-bromopyridazone-(6) (I) and, for comparison, with 2 kg. per hectare of 1-phenyl-4-amino-5-bromopyridazone-(6) (II), each amount of the active ingredients being dispersed in 500 liters of water per hectare.

After 3 to 4 weeks it was ascertained that active ingredient I had a selectivity of Beta vulgaris, Soja hispida, Triticum spp. and Hordeum vulgare far superior to that of II and approximately the same action as II on broad-leaved and grassy weeds.

The results of the experiment are given in the following table:

|  | Active ingredient | |
|---|---|---|
|  | I | II |
| Crop plants: |  |  |
| Beta vulgaris | 0 | 15 |
| Zea mays | 10 | 30 |
| Soja hispida | 0 | 40 |
| Triticum spp | 0 | 20 |
| Hordeum vulgare | 0 | 20 |
| Unwanted plants: |  |  |
| Echinochloa crus-galli | 100 | 90 |
| Bromus tectorum | 100 | 80 |
| Chrysanthemum spp | 95 | 100 |
| Galinsoga parviflora | 90 | 90 |
| Atriplex spp | 90 | 90 |

Note.—0=No damage; 100=Complete destruction.

EXAMPLE 3

60 parts by weight of Compound I from Example 2 is mixed with 40 parts by weight of N-methyl-α-pyrrolidone. A mixture is obtained which is suitable for application in the form of very fine drops.

EXAMPLE 4

20 parts by weight of Compound I from Example 2 is dissolved in a mixture consisting of 80 parts by weight of xylene, 10 parts by weight of the adduct of 8 to 10 moles of ethylene oxide to 1 mole of oleic acid-N-monoethanolamide, 5 parts by weight of the calcium salt of dodecylbenzenesulfonic acid, and 5 parts by weight of the adduct of 40 moles of ethylene oxide to 1 mole of castor oil. By pouring the solution into 100,000 parts by weight of water and uniformly distributing it therein, an aqueous dispersion is obtained containing 0.02% by weight of the active ingredient.

EXAMPLE 5

20 parts by weight of Compound I from Example 2 is dissolved in a mixture consisting of 40 parts by weight of cyclohexanone, 30 parts by weight of isobutanol, 20 parts by weight of the adduct of 7 moles of ethylene oxide to 1 mole of isooctylphenol, and 10 parts by weight of the adduct of 40 moles of ethylene oxide to 1 mole of castor oil. By pouring the solution into 100,000 parts by weight of water and uniformly distributing it therein, an aqueous dispersion is obtained containing 0.02% by weight of the active ingredient.

EXAMPLE 6

20 parts by weight of Compound I from Example 2 is dissolved in a mixture consisting of 25 parts by weight of cyclohexanol, 65 parts by weight of a mineral oil fraction having a boiling point between 210° and 280° C., and 10 parts by weight of the adduct of 40 moles of ethylene oxide to 1 mole of castor oil. By pouring the solution into 100,000 parts by weight of water and uniformly distributing it therein, an aqueous dispersion is obtained containing 0.02% by weight of the active ingredient.

EXAMPLE 7

20 parts by weight of Compound I from Example 2 is well mixed with 3 parts by weight of the sodium salt of diisobutylnaphthalene - α - sulfonic acid, 17 parts by weight of the sodium salt of a lignin-sulfonic acid obtained from a sulfite waste liquor, and 60 parts by weight of powdered silica gel, and triturated in a hammer mill. By uniformly distributing the mixture in 20,000 parts by weight of water, a spray liquid is obtained containing 0.1% by weight of the active ingredient.

EXAMPLE 8

3 parts by weight of Compound I from Example 2 is intimately mixed with 97 parts by weight of particulate kaolin. A dust is obtained containing 3% by weight of the active ingredient.

EXAMPLE 9

30 parts by weight of Compound I from Example 2 is intimately mixed with a mixture consisting of 92 parts by weight of powdered silica gel and 8 parts by weight of paraffin oil which has been sprayed onto the surface of this silica gel. A formulation of the active ingredient is obtained having good adherence.

EXAMPLE 10

Preparation of N - phenylaminobromopyridazonyl-N-acetoacetate: 100 parts (by weight) of acetonitrile, 66.5 parts of 1-phenyl-4-amino-5-bromopyridazone and 1.0 part of p-toluenesulfonic acid are dispersed with one another and the whole heated under reflux (B.P. approx. 83° C.). Over a period of 30 minutes, 24.0 parts of 97% by weight diketene is slowly added while stirring. The mixture is boiled for a further hour under reflux; 100 parts of water is then added. After some time crystallization begins. Over a period of about 1 hour, a further 400 parts of water is now added. The mixture is cooled to room temperature and stirred for several hours. The mixture is suction filtered and the filtered material washed with 500 parts of water.

Yield: 79 parts; M.P.: 133° to 138° C.

We claim:

1. A substituted 1-phenyl-4-acetoacetatamino - 5 - halopyridazone-(6) of the formula

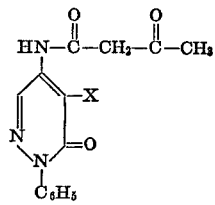

where X denotes bromine or chlorine.

2. 1-phenyl-4-acetoacetatamino-5-bromopyridazone-(6).
3. 1-phenyl-4-acetoacetatamino-5-chloropyridazone-(6).

References Cited

UNITED STATES PATENTS 3,360,357 12/1967 Reicheneder et al. __ 260—250 A
3,555,026 1/1971 Reicheneder et al. __ 260—250 A
3,471,493 10/1969 Reicheneder et al. __ 260—250 A NICHOLAS S. RIZZO, Primary Examiner U.S. Cl. X.R.

71—92